(12) United States Patent
Goslin

(10) Patent No.: US 11,336,806 B2
(45) Date of Patent: May 17, 2022

(54) DUAL-FUNCTION DISPLAY AND CAMERA

(71) Applicant: DISNEY ENTERPRISES, INC., Burbank, CA (US)

(72) Inventor: Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/538,806

(22) Filed: Aug. 12, 2019

(65) Prior Publication Data

US 2021/0051254 A1  Feb. 18, 2021

(51) Int. Cl.
*H04N 5/335* (2011.01)
*H04N 5/225* (2006.01)
*H04N 5/238* (2006.01)

(52) U.S. Cl.
CPC ......... *H04N 5/2257* (2013.01); *H04N 5/2254* (2013.01); *H04N 5/238* (2013.01)

(58) Field of Classification Search
CPC ..... H04N 5/2257; H04N 5/2254; H04N 5/238
USPC ........................................................ 348/273
See application file for complete search history.

(56) References Cited

U.S. PATENT DOCUMENTS

| | | | | |
|---|---|---|---|---|
| 2004/0165097 A1* | 8/2004 | Drowley | ........... | H01L 27/14601 348/340 |
| 2005/0266603 A1* | 12/2005 | Findlater | ........... | H01L 27/14627 438/69 |
| 2006/0169870 A1* | 8/2006 | Silsby | ............... | H01L 27/14627 250/208.1 |
| 2008/0024650 A1* | 1/2008 | Nomura | .................... | G02B 7/08 348/348 |
| 2009/0207267 A1* | 8/2009 | Inoue | ................ | H01L 27/14685 348/222.1 |
| 2010/0066800 A1* | 3/2010 | Ryf | ........................ | H04N 7/144 348/14.01 |
| 2011/0134504 A1* | 6/2011 | Ellis-Monaghan | ..... | B81B 3/004 359/290 |
| 2015/0036065 A1* | 2/2015 | Yousefpor | ........... | H04M 1/0266 349/12 |
| 2017/0255809 A1* | 9/2017 | Huang | ............... | G06K 9/00013 |

* cited by examiner

*Primary Examiner* — Usman A Khan
(74) *Attorney, Agent, or Firm* — Artegis Law Group, LLP

(57) ABSTRACT

A display screen includes a plurality of pixels, wherein each pixel in the plurality of pixels includes at least one light-emitting element; and a plurality of light sensors, wherein each light sensor in the plurality of light sensors is disposed adjacent to a corresponding light-emitting element of a pixel in the plurality of pixels and is configured to convert received light into an electrical signal corresponding to a portion of an image.

20 Claims, 4 Drawing Sheets

DUAL-FUNCTION DISPLAY AND CAMERA

BACKGROUND OF THE PRESENT DISCLOSURE

Field of Present Disclosure

The present disclosure relates generally to mobile computing devices, and, more specifically, to a dual-function display and camera.

DESCRIPTION OF THE RELATED ART

A common feature of mobile phones, smartphones, electronic tablets and other mobile computing devices is the front-facing camera. A front-facing camera is directed toward the user and therefore resides on the same side of the device as the display screen. Among other things, front-facing cameras enable self-portrait images and/or videos to be captured while the user can see himself/herself on the display screen of the device. Because the user has a live preview of an image or video being captured, front-facing cameras are important for taking "selfies" and for video-telephony.

One drawback to including a front-facing camera on a device is that the front-facing camera prevents the display from extending across the face of the device. For example, in some devices, an edge of the display is located away from the edge of the device to accommodate the front-facing camera, causing the display to be significantly smaller than the face of the device. Alternatively, the front-facing camera "interferes" with the display screen of the device and prevents the display screen from being a complete rectangle. More specifically, positioning a front-facing camera on the same side of a device as the display screen typically requires a notch or circular cut-out to be formed in the display screen to accommodate the front-facing camera. Thus, the usable area of the display screen, which is a critical aspect of mobile computing device designs, is reduced by the area of the notch or cut-out. Further, the shape of the display screen typically becomes asymmetrical. Among other things, a reduced, asymmetrical display screen area can impede the layout of icons and other graphical user interface elements within the display and can alter how application information and graphics have to be displayed with the display. In addition, manufacturing an irregularly shaped display screen is more complicated than manufacturing a simpler rectangular screen.

As the foregoing illustrates, what is a more effective way of integrating forward-facing cameras into mobile computing devices.

SUMMARY

One embodiment of the present disclosure sets forth a display screen that includes a plurality of pixels, wherein each pixel in the plurality of pixels includes at least one light-emitting element; and a plurality of light sensors, wherein each light sensor in the plurality of light sensors is disposed adjacent to a corresponding light-emitting element of each pixel in the plurality of pixels and is configured to convert received light into an electrical signal corresponding to at least a portion of an image.

At least one technical advantage of the disclosed design relative to the prior art is that a computing device can include a front-facing camera without a notch or cut-out being formed in the display screen of the computing device to accommodate the front-facing camera. Consequently, the disclosed design allows for a regular-shaped display screen and increases the viewable area of the display screen relative to prior art designs. Thus, with the disclosed design, the layout of icons and other information is not impacted by a relatively smaller display screen with an irregular shape. These technical advantages represent one or more technological improvements over prior art designs.

BRIEF DESCRIPTION OF THE DRAWINGS

So that the manner in which the above recited features of the disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

For clarity, identical reference numbers have been used, where applicable, to designate identical elements that are common between figures. It is contemplated that features of one example aspect may be incorporated in other example aspects without further recitation.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

According to various embodiments, a display screen for a computing device includes a forward-facing camera, where the light sensors for each pixel of the forward-facing camera are distributed among the light-emitting pixels of the display screen. Consequently, no notch or cut-out is formed in the display screen of the computing device, which maximizes the viewable area of the display screen. One such embodiment is illustrated in FIG. 1.

Figure 1:
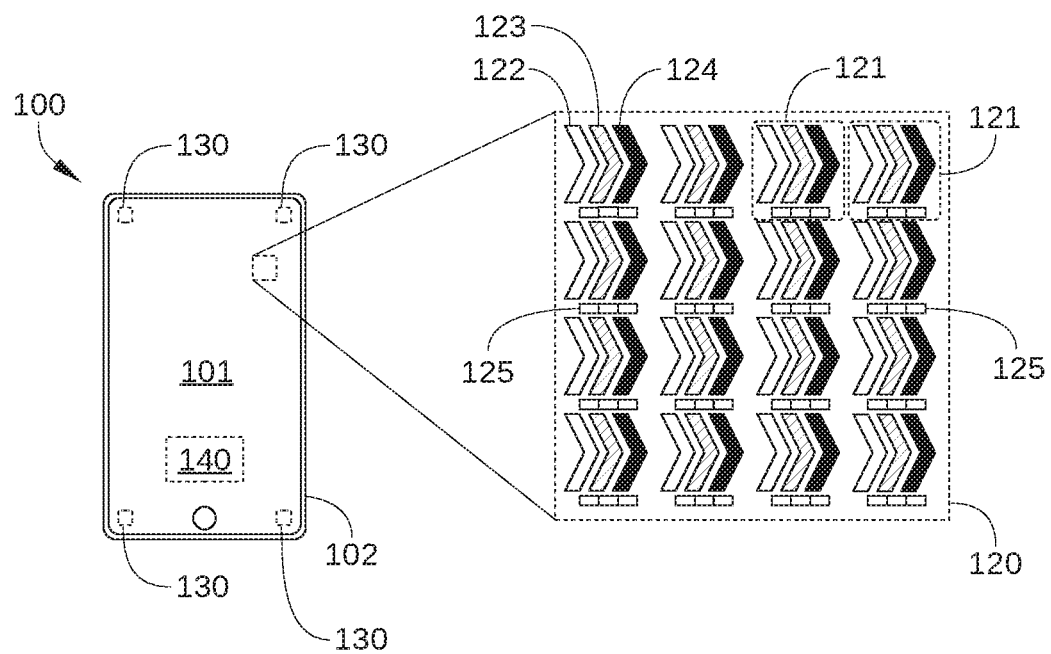
FIG. 1 illustrates a mobile computing device with a display screen configured according to the various embodiments.

FIG. 1 illustrates a mobile computing device 100 with a display screen configured according to the various embodiments. Mobile computing device 100 is a computing device that includes a display screen 101 disposed within a body 102, such as a smartphone, an electronic tablet, a mobile phone, a laptop computer, a smart watch, and the like. Display screen 101 can be based on any display technology suitable for use in mobile computing device 100. For example, display screen 101 can be a liquid crystal display (LCD), light-emitting diode (LED) display, an organic light-emitting diode (OLED) display, an active matrix organic light emitting diode (AMOLED) display, a plasma display panel (PDP), and the like.

In some embodiments, mobile computing device 100 includes a range-detecting sensor 130 that is configured to detect a range of an object that is in the field of view of a front-facing camera (described below) that is incorporated into display screen 101. In some embodiments, range-detecting sensor 130 includes two or more light sensors incorporated into display screen 101, such as light sensors 125.

In some embodiments, mobile computing device 100 includes a front-facing camera controller 140 that is configured to control individual elements of the front-facing camera incorporated into display screen 101, such as light sensor read-out electronics, actuators for microlens positioning, range-detecting sensor 130, and the like. In some embodiments, front-facing camera controller 140 is further configured to receive user inputs related to operation of the front-facing camera and to perform certain operations in response to such inputs.

As shown in magnified region 120 of display screen 101, display screen 101 includes a plurality of pixels 121, which are the smallest addressable location elements of display screen 101. Thus, each pixel 121 is the smallest controllable element of an image displayed via display screen 101. As such, each pixel 121 includes multiple sub-pixels, which are light-emitting elements for implementing an additive color model to reproduce a broad array of colors. Thus, each pixel is configured to emit light of a perceived color that is associated with a specific portion of an image being displayed by display screen 101. For example, in the embodiment illustrated in FIG. 1, pixels 121 each include a red sub-pixel 122, a green sup-pixel 123, and a blue sub-pixel 124, which have a chevron configuration for widening the viewing cone of display screen 101. In other embodiments, pixels 121 of display screen 101 can include four or more sub-pixels and can have any other sub-pixel layout suitable for use in a computing device. For example, pixels 121 can include sub-pixels that are parallel strips or diamond-shaped, arranged in an RGBG pattern, etc.

In addition, included in or adjacent to each pixel 121 of display screen 101 is at least one light sensor 125. Each light sensor 125 is configured to receive light and generate a signal that corresponds to a portion of an image being captured by mobile computing device 100. Light sensors 125 can be any technically feasible light-detecting device suitable for being implemented in display screen 101 as described herein. Examples of such light-detecting devices include, without limitation, photoemission, photoelectric, semiconductor, photovoltaic, thermal, photochemical, polarization, graphene, or silicon photodetectors.

As shown, each light sensor 125 is disposed adjacent to a respective pixel or sub-pixel of display screen 101. In the embodiment illustrated in FIG. 1, each light sensor 125 includes three light-detecting elements that are each configured to detect a different band or frequency of light, thereby enabling capture of a color image. In such an embodiment, a color filter array can be disposed between the light-detecting elements and incident light, such as a Bayer filter, so that each light-detecting element of a particular light sensor only receives light of a certain band or frequency. One such embodiment is illustrated in FIGS. 2A and 2B.

Figure 2A:
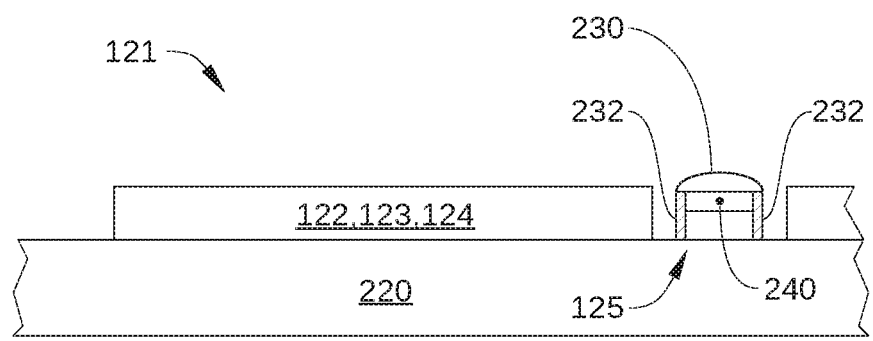
FIG. 2A illustrates a side view of pixel of the display screen of FIG. 1, according to various embodiments.
Figure 2B:
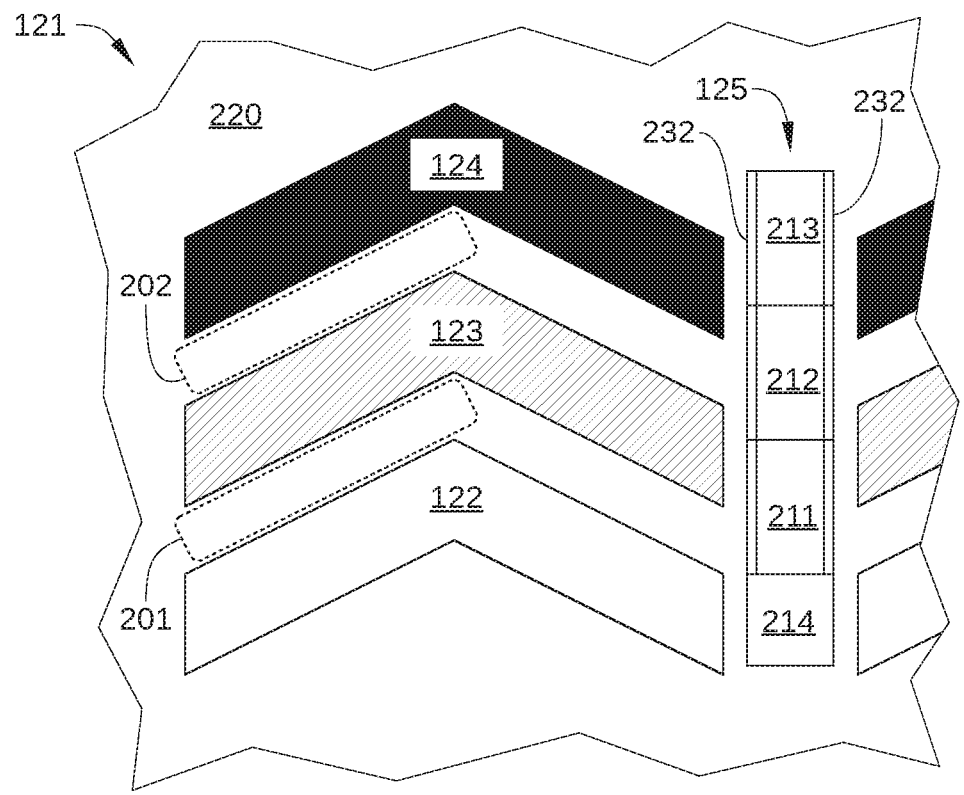
FIG. 2B illustrates a plan view of one pixel of the display screen of FIG. 1, according to various embodiments.

FIG. 2A illustrates a side view of one pixel 121 of display screen 101, according to various embodiments, and FIG. 2B illustrates a plan view of one pixel 121 of display screen 101, according to various embodiments. In the embodiment illustrated in FIGS. 2A and 2B, light sensor 125 is disposed in an area of pixel 121 that is not utilized for emitting light. That is, light sensor 125 is disposed between the red sub-pixel 122, green sup-pixel 123, and blue sub-pixel 124 of one pixel 121 and the red sub-pixel 122, green sup-pixel 123, and blue sub-pixel 124 of another pixel 121. Alternatively, in some embodiments, one or more light-detecting elements of light sensor 125 are disposed in an area between two sub-pixels of pixel 121. For example, in one such embodiment, one or more light-detecting elements of light sensor 125 are disposed in an area 201 between red sub-pixel 122 and green sub-pixel 123 and/or in an area 202 between green sub-pixel 123 and blue sub-pixel 124, among others. Alternatively, in some embodiments, light sensors 125 can be disposed in within an area associated with a single pixel 121.

In the embodiment illustrated in FIGS. 2A and 2B, light sensor 125 includes three sub-pixel light-detecting elements 211, 212, and 213, that are each configured to detect a different band or frequency of light. In addition, sub-pixel light-detecting elements 211, 212, and 213 of light sensor 125 are disposed adjacent to and/or in contact with each other. In other embodiments, sub-pixel light-detecting elements 211, 212, and/or 213 may be disposed in separate areas of pixel 125 that are not occupied by red sub-pixel 122, green sup-pixel 123, or blue sub-pixel 124, such as area 201 or area 202. A color filter array 240 is disposed on a light-receiving surface of sub-pixel light-detecting elements 211, 212, and 213.

In some embodiments, light sensor 125 may further include control and read-out electronics 214 for reading out, amplifying, and resetting accumulated charge in each of sub-pixel light-detecting elements 211, 212, and 213 during image capture. Alternatively or additionally, display screen 101 may include further control and read-out electronics (not shown) for facilitating read out, amplification, and reset of accumulated charge in the sub-pixel light-detecting element 211, 212, and 213 of each light sensor 125 of display screen 101. In some embodiments, such control and read-out electronics are included in front-facing camera controller 140 of FIG. 1.

In the embodiment illustrated in FIGS. 2A and 2B, light sensor 125 is disposed on a common substrate 220 with red sub-pixel 122, green sup-pixel 123, and blue sub-pixel 124. For example, in some embodiments, common substrate 220 is an opaque metallic backing plate. Thus, light sensor 125 can be a separate device or sub-assembly that is fabricated independently from red sub-pixel 122, green sup-pixel 123, and blue sub-pixel 124, and is then mounted on common substrate 220 with the light-emitting elements of pixel 121. Alternatively, in some embodiments, light sensor 125 can be formed in conjunction with the red sub-pixels 122, green sup-pixels 123, and blue sub-pixels 124 of display screen 101. In such embodiments, pixels 121 of display screen 101 are fabricated together as a layered structure, such as an in-plane switching (IPS) LCD or a twisted nematic (TN) LCD. In such embodiments, light sensor 125 can include semiconductor light sensors formed on a substrate that is included in such a layered structure. An embodiment of one such structure is illustrated in FIG. 3.

Figure 3:
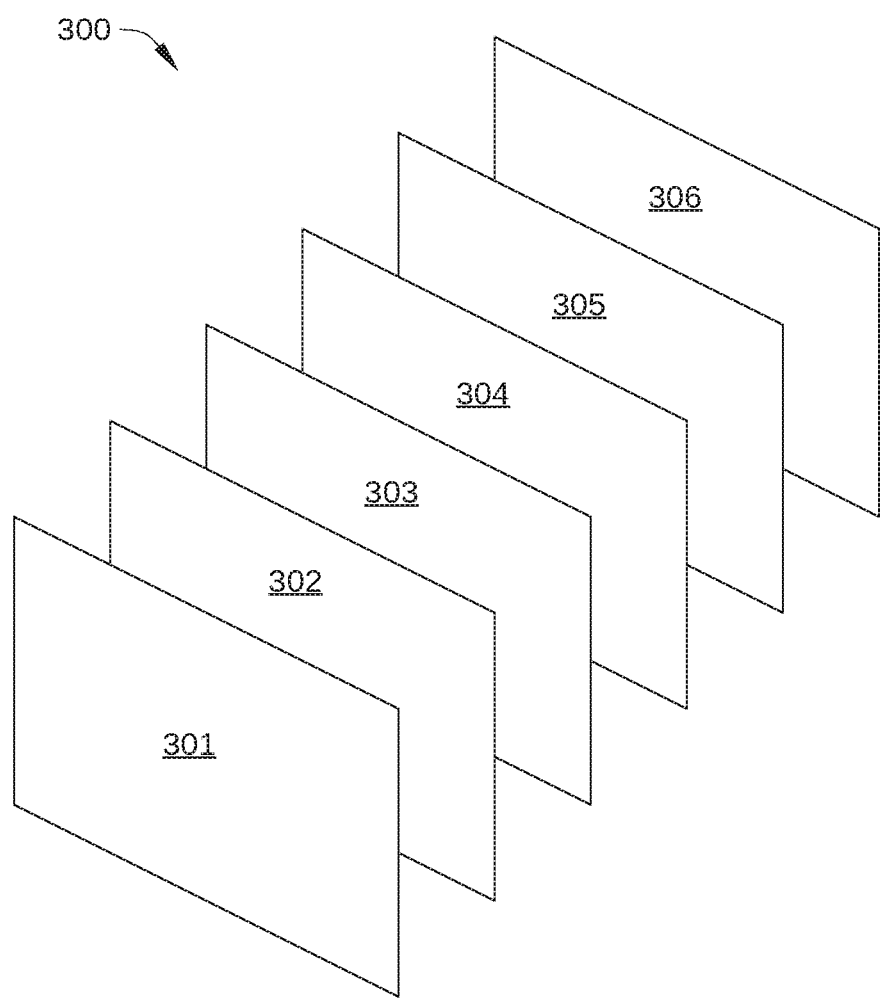
FIG. 3 illustrates an exploded view of an LCD-based display screen that can be incorporated into the mobile computing device of FIG. 1, according to various embodiments.

FIG. 3 illustrates an exploded view of an LCD-based display screen 300 that can be incorporated into mobile computing device 100, according to various embodiments. As shown, LCD-based display screen 301 includes a plurality of layers that together form a display screen for a computing device, such as mobile computing device 100 of FIG. 1. Specifically, LCD-based display screen 300 includes a coated glass layer 301, an LCD display layer 302, an LED light panel 303, a Mylar light-reflecting layer 304, a capacitive sensor layer 305, and a metallic backing plate 306, among others. According to some embodiments of the disclosure, light sensor 125 is a semiconductor light sensor formed on capacitive sensor layer 305 or on a substrate included in LCD display layer 302, such as a glass substrate on which the indium tin oxide (ITO) electrodes of LCD display layer 302 are formed. For example, in one such embodiment, sub-pixel light-detecting elements 211, 212, and 213 of light sensor 125 are charge-coupled devices (CCD) or a complementary metal-oxide-semiconductor (CMOS) or N-type metal-oxide-semiconductor (NMOS) sensors.

Returning to FIGS. 2A and 2B, light sensor 125 includes a microlens 230 configured to direct light 231 that is incident on microlens 230 onto sub-pixel light-detecting elements 211, 212, and 213. Microlens 230 of light sensor 125 is configured to be positioned independently from the positions of the microlenses 230 associated with other light sensors 125 of display screen 101, for example via microelectromechanical systems (MEMS) actuators 232.

Microlens 230 can be formed using MEMS fabrication techniques known in the art. In the embodiment illustrated in FIGS. 2A and 2B, microlens 230 is shown as a cylindrical lens. In other embodiments, microlens 230 can be any other technically feasible and manufacturable configuration of microlens, such as a refractive, diffractive, anamorphic, aspherical, spherical, positive (convex) or negative (concave) lens. In some embodiments, the shape and/or orientation of each microlens 230 of display screen 101 can vary as a function of the position of that particular microlense 230 on display screen 101. Alternatively or additionally, the shape and/or orientation of each microlens 230 of display screen 101 can vary as a function of an intended range of focal length for the front-facing camera that is incorporated into display screen 101 and includes light sensors 125. Alternatively or additionally, in some embodiments, each microlens 230 is configured as a different portion of a single lens. For example, each microlens 230 can be configured with a different portion of the curvature of a single lens.

MEMS actuators 232 can be formed using MEMS fabrication techniques known in the art, and can be fabricated in conjunction with microlenses 230. MEMS actuators 232 can be controlled, for example, via front-facing camera controller 140. In some embodiments, MEMS actuators 232 include thermal actuators, which produce motion via thermal expansion amplification. In a MEMS thermal actuator, a small deflection from thermal expansion of one component of the actuator results in a proportionately larger deflection of the overall actuator. In such embodiments, MEMS actuators 232 can be fabricated from doped single crystal silicon or polysilicon as a compliant member. Further, increases in temperature can be achieved within each MEMS actuator 232 via electrical resistive heating. Other MEMS actuators suitable for use as MEMS actuators 232 include, without limitation, electrostatic (parallel plate) and magnetic piezoelectric actuators, among others. In some embodiments, MEMS actuators 232 and microlens 230 are formed as a single device.

In some embodiments, a front-facing camera incorporated into display screen 101 can capture an image via suitable actuation of each of MEMS actuators 232, so that each microlens 230 focuses a portion of an image onto the associated light sensor 125 of display screen 101. The different positions of each microlens 230 causes a different discrete portion of an image to be focused on the light sensor 125 associated with that microlens. Taken together, the image signals from each light sensor 125 can then be assembled, for example via front-facing camera controller 140, into a single coherent image. Thus, microlenses 230 can act as a distributed lens. One such embodiment is illustrated in FIG. 4.

Figure 4:
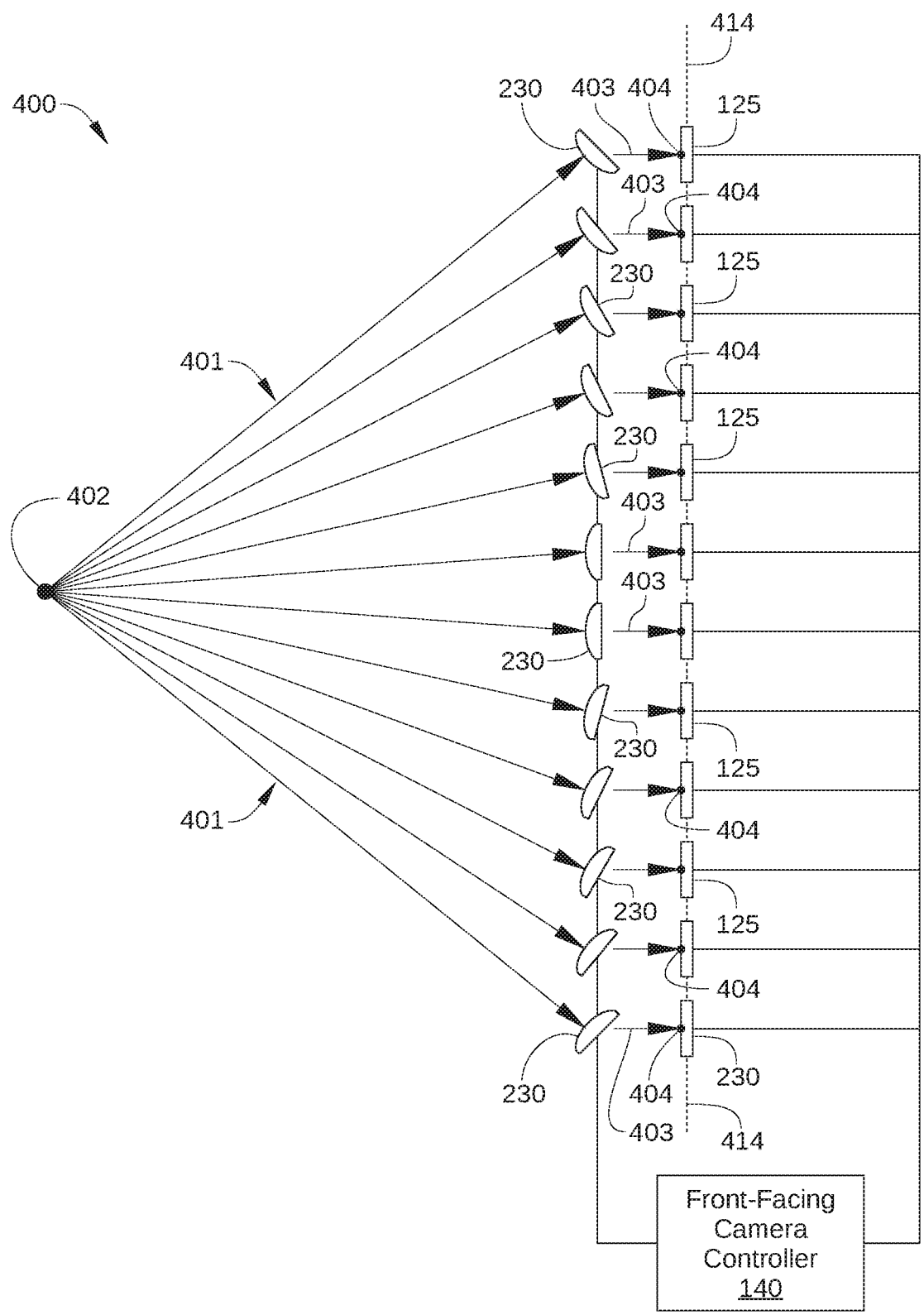
FIG. 4 illustrates how a front-facing camera incorporated into the display screed of the mobile computing device of FIG. 1 captures an image, according to various embodiments.

FIG. 4 illustrates how a front-facing camera 400 incorporated into display screen 101 captures an image, according to various embodiments. As shown, light rays 401 emanate from a focal point 402 of front-facing camera 400. Each microlens 230 of front-facing camera 400 is oriented to receive light rays 401 that are incident on that microlens 230 and direct (e.g., steer and/or focus) light rays 403 onto the light sensor 125 associated with that microlens 230. The shape and orientation of each microlens 230 is selected so that the light sensor 125 associated with that microlens 230 is disposed at a focal point 404 of that microlens 230. Thus, light sensors 125 are disposed on a single focal plane 414 of front-facing camera 400. As a result, light rays 402 are focused on each light sensor 125 of front-facing camera 400, and image signals generated by each light sensor 125 can be assembled to form an image. For example, in some embodiments, each microlens 230 is configured to direct light from a different portion of an object disposed at or near focal point 402 to the corresponding light sensor 125.

In operation, in an example embodiment front-facing camera controller 140 receives a signal indicating an image is to be captured, such as a user input from a mobile computing device 100 that includes front-facing camera 400, or an input generated by the mobile computing device 100. In some instances, the input includes information indicating a focal point for the image to be captured, and in other embodiments front-facing camera controller 140 determines the focal point for the image to be captured, for example based on a signal from range-detecting sensor 130. In response to receiving the input, front-facing camera controller 140 orients each microlens 230 to receive light rays 401 from the focal point for the image to be captured (i.e., focal point 402) and direct that light (as light rays 403) onto the light sensor 125 that corresponds to that microlens 230. Further, the orientation of the microlens 230 is selected so that light rays 403 are focused on focal point 404, where focal point 404 substantially coincides with focal plane 414 and light sensor 125. Front-facing camera controller 140 then reads out image signals generated by light sensors 125 and generates a digital image based on the image signals.

In sum, the light sensors of a front-facing camera are incorporated into a display screen at the pixel level. That is, each light sensor for the forward-facing camera is disposed adjacent to a respective light-emitting element of the display screen. Thus, the light sensors for each pixel of the forward-facing camera are distributed across the surface of the display screen in areas that are not occupied by light-emitting elements of the display screen.

At least one technical advantage of disclosed design relative to the prior art is that a computing device can include a front-facing camera without a notch or cut-out being formed in the display screen of the computing device to accommodate the front-facing camera. Consequently, the disclosed design allows for a regular-shaped display screen and increases the viewable area of the display screen relative to prior art designs. Thus, with the disclosed design, the layout of icons and other information is not impacted by a relatively smaller display screen with an irregular shape. These technical advantages represent one or more technological improvements over prior art designs.

1. In some embodiments, a display screen, includes: a plurality of pixels, wherein each pixel in the plurality of pixels includes at least one light-emitting element; and a plurality of light sensors, wherein each light sensor in the plurality of light sensors is disposed adjacent to a corresponding light-emitting element of a pixel in the plurality of pixels and is configured to convert received light into an electrical signal corresponding to a portion of an image.

2. The display screen of clause 1, wherein each light sensor in the plurality of light sensors comprises at least one light-detecting element and one or more microlenses configured to direct incident light onto the at least one light-detecting element.

3. The display screen of clauses 1 or 2, wherein each microlens of the one or more microlenses is configured to be positioned independently of the other microlenses.

4. The display screen of any of clauses 1-3, wherein each light sensor also includes at least one microelectromechanical systems actuator configured to adjust the position of the one or more microlenses included in the light sensor.

5. The display screen of any of clauses 1-4, wherein the portion of the image comprises a single pixel of the image.

6. The display screen of any of clauses 1-5, wherein each light sensor included in the plurality of light sensors has three sub-pixel light-detecting elements, wherein each sub-pixel light-detecting element detects a different portion of the light spectrum.

7. The display screen of any of clauses 1-6, wherein each light sensor included in the plurality of light sensors has a color filter array configured to cause each sub-pixel light-detecting element to receive a different band of light.

8. The display screen of any of clauses 1-7, wherein each light sensor is disposed between two light-emitting elements of the display screen.

9. The display screen of any of clauses 1-8, wherein one of the two light-emitting elements is associated with a first pixel included in the plurality of pixels, and another one of the two light-emitting elements is associated with a second pixel included in the plurality of pixels.

10. The display screen of any of clauses 1-9, wherein each of the two light-emitting elements is associated with a first pixel included in the plurality of pixels.

11. In some embodiments, a computing device includes: a display screen, comprising: a plurality of pixels, wherein each pixel in the plurality of pixels includes at least one light-emitting element; and a plurality of light sensors, wherein each light sensor in the plurality of light sensors includes a one or more movable microlenses, is disposed adjacent to a corresponding light-emitting element of a pixel in the plurality of pixels, and is configured to convert received light into an electrical a signal corresponding to a portion of an image; and a controller configured to orient each of the one or more microlenses to receive light rays from a same focal point and focus the light rays onto a light-detecting element that corresponds to the microlens.

12. The computing device of clause 11, wherein the controller is further configured to determine the focal point based on information included in a user input.

13. The computing device of clauses 11 or 12, wherein the controller is further configured to determine the focal point based on a signal from a range-detecting sensor included in the display screen.

14. The computing device of any of clauses 11-13, wherein the range-detecting sensor includes two or more light sensors from the plurality of light sensors.

15. The computing device of any of clauses 11-14, wherein the controller is configured to orient each of the one or more microlenses to receive light rays from the same focal point so that each light sensor is disposed in a same focal plane.

16. The computing device of any of clauses 11-15, wherein each of the one or more microlenses is configured to be positioned independently of the other microlenses.

17. The computing device of any of clauses 11-16, wherein the controller is configured to orient each of the one or more microlenses via at least one microelectromechanical systems actuator.

18. The computing device of any of clauses 11-17, wherein the at least one microelectromechanical systems actuator is included in the light sensor that includes the one or more microlenses.

19. The computing device of any of clauses 11-18, wherein each light sensor included in the plurality of light sensors has three sub-pixel light-detecting elements, wherein each sub-pixel light-detecting element detects a different portion of the light spectrum.

20. The computing device of any of clauses 11-19, wherein each light sensor is disposed between two light-emitting elements of the display screen.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

The invention claimed is:

1. A display screen, comprising:
a plurality of pixels, wherein each pixel in the plurality of pixels includes:
at least one light-emitting element; and
a corresponding light sensor, wherein the corresponding light sensor includes one or more movable microlenses, is disposed adjacent to the at least one light-emitting element, and is configured to convert received light into an electrical signal corresponding to a portion of an image, and wherein each of the one or more microlenses is oriented to direct light from a different portion of the image disposed at a same focal point to the corresponding light sensor based on the same focal point.

2. The display screen of claim 1, wherein the corresponding light sensor comprises at least one light-detecting element and the one or more movable microlenses are configured to direct incident light onto the at least one light-detecting element.

3. The display screen of claim 2, wherein each microlens of the one or more movable microlenses is configured to be positioned independently of the other microlenses.

4. The display screen of claim 2, wherein the corresponding light sensor also includes at least one microelectromechanical systems actuator configured to adjust the position of the one or more movable microlenses included in the light sensor.

5. The display screen of claim 1, wherein the portion of the image comprises a single pixel of the image.

6. The display screen of claim 1, wherein the corresponding light sensor has three sub-pixel light-detecting elements, wherein each sub-pixel light-detecting element detects a different portion of the light spectrum.

7. The display screen of claim 6, wherein the corresponding light sensor has a color filter array configured to cause each sub-pixel light-detecting element to receive a different band of light.

8. The display screen of claim 1, wherein the corresponding light sensor is disposed between two light-emitting elements of the display screen.

9. The display screen of claim 8, wherein one of the two light-emitting elements is associated with a first pixel included in the plurality of pixels, and another one of the two light-emitting elements is associated with a second pixel included in the plurality of pixels.

10. The display screen of claim 8, wherein each of the two light-emitting elements is associated with a first pixel included in the plurality of pixels.

11. A computing device, comprising:
a display screen, comprising:
a plurality of pixels, wherein each pixel in the plurality of pixels includes:
at least one light-emitting element; and
a corresponding light sensor, wherein the corresponding light sensor includes a one or more movable microlenses, is disposed adjacent to the at least one light-emitting element, and is configured to convert received light into an electrical a signal corresponding to a portion of an image; and
a controller configured to orient each of the one or more microlenses to receive light rays from a same focal point and focus the light rays onto a light sensor that corresponds to the microlens, wherein each of the one or more microlenses is oriented to direct light from a different portion of the image disposed at the same focal point to the corresponding light sensor based on the same focal point.

12. The computing device of claim 11, wherein the controller is further configured to determine the focal point based on information included in a user input.

13. The computing device of claim 11, wherein the controller is further configured to determine the focal point based on a signal from a range-detecting sensor included in the display screen.

14. The computing device of claim 13, wherein the range-detecting sensor includes two or more light sensors.

15. The computing device of claim 11, wherein the controller is configured to orient each of the one or more microlenses to receive light rays from the same focal point so that each light sensor is disposed in a same focal plane.

16. The computing device of claim 11, wherein each of the one or more microlenses is configured to be positioned independently of the other microlenses.

17. The computing device of claim 11, wherein the controller is configured to orient each of the one or more microlenses via at least one microelectromechanical systems actuator.

18. The computing device of claim 11, wherein the at least one microelectromechanical systems actuator is included in the light sensor that includes the one or more microlenses.

19. The computing device of claim 11, wherein the corresponding light sensor has three sub-pixel light-detecting elements, wherein each sub-pixel light-detecting element detects a different portion of the light spectrum.

20. The computing device of claim 11, wherein the corresponding light sensor is disposed between two light-emitting elements of the display screen.

* * * * *